Figure 1:
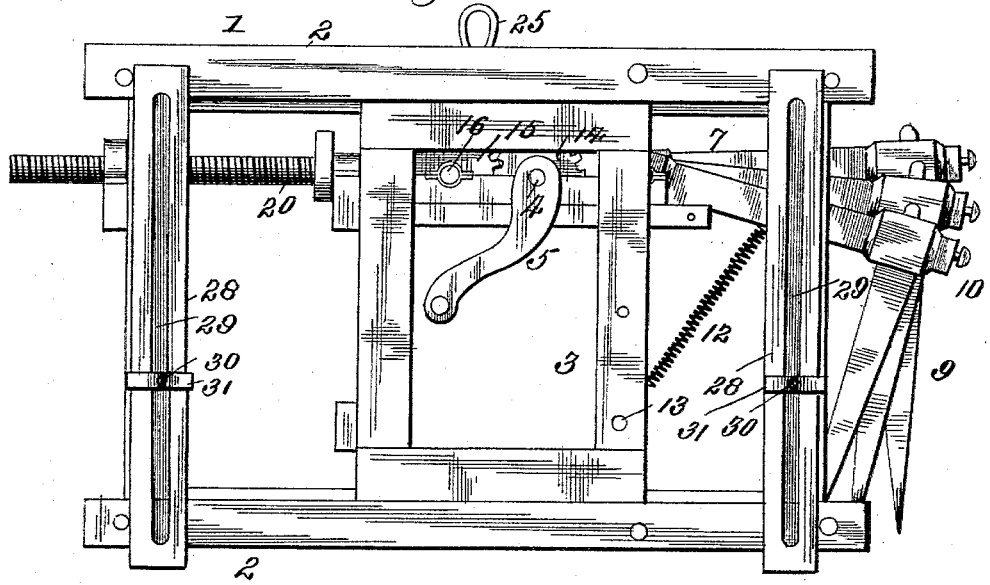

(No Model.) 2 Sheets—Sheet 1.

R. L. MAY & L. T. HUNTER.
MILLSTONE DRESSING MACHINE.

No. 562,733. Patented June 23, 1896.

Witnesses
John Truyne
A. B. Smit

Inventors:
Redding L. May,
Lewis T. Hunter
By H. R. Willson
Attorney (No Model.) 2 Sheets—Sheet 2.
R. L. MAY & L. T. HUNTER.
MILLSTONE DRESSING MACHINE.
No. 562,733. Patented June 23, 1896.
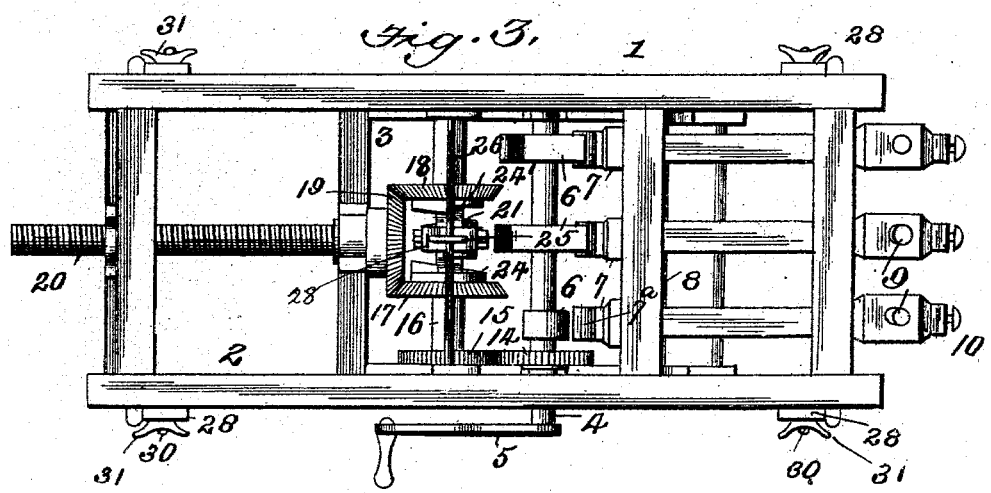
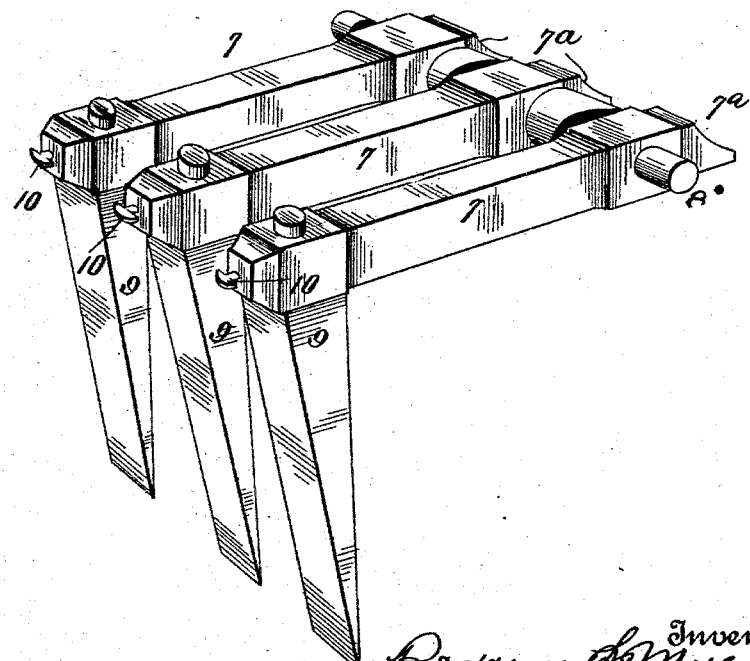
Witnesses:
Inventors:
Redding L. May
Lewis T. Hunter
By H. D. Evilson,
Attorney

UNITED STATES PATENT OFFICE.

REDDING L. MAY AND LEWIS T. HUNTER, OF TRENTON, NORTH CAROLINA.

MILLSTONE-DRESSING MACHINE.

SPECIFICATION forming part of Letters Patent No. 562,733, dated June 23, 1896.

Application filed December 4, 1894. Serial No. 530,792. (No model.)

*To all whom it may concern:*

Be it known that we, REDDING L. MAY and LEWIS T. HUNTER, citizens of the United States, residing at Trenton, in the county of Jones and State of North Carolina, have invented certain new and useful Improvements in Millstone-Dressing Machines; and we do declare the following to be a full, clear, and exact description of the invention, such as will enable others skilled in the art to which it appertains to make and use the same.

Our invention has relation to millstone dressing or sharpening machines; and among the objects in view is to provide a machine of the character described which is of inexpensive and simple construction, and which is adapted to thoroughly and quickly dress or sharpen a millstone when the latter has become worn; and with the above and other objects in view our invention consists in the novel construction, arrangement, and combination of parts, as hereinafter fully described, illustrated in the drawings, and pointed out in the appended claim.

Figure 2:
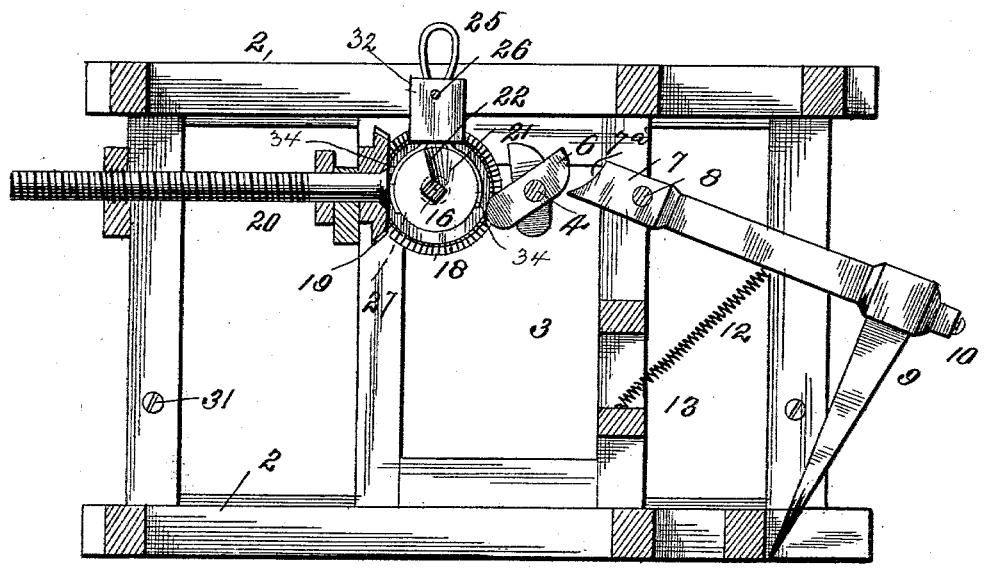

In the drawings, Figure 1 is a side elevation of our improved machine; Fig. 2, a vertical longitudinal section thereof; Fig. 3, a plan view; Fig. 4, a perspective view of the picks and their supporting-arms and shaft.

In carrying out our invention we provide a suitable main supporting-frame 1, between the upper and lower longitudinal rails 2 of which is arranged and adapted to reciprocate a frame 3. Mounted in suitable bearings in said frame 3 is a transverse shaft 4, provided at one end with an operating crank or handle 5, whereby the shaft may be rotated. Upon the shaft 4 are mounted a series of cams or arms 6, which are adapted to act upon the rear ends of a series of arms 7, pivotally mounted upon a shaft 8, supported in the frame 3. The rear ends of the arms have their upper faces beveled or inclined, as seen at 7ª, against which inclined faces the cams or arms 6 bear when the shaft 4 is rotated.

9 indicates a series of picks adjustably held in the forward ends of the arms 7 by means of set-screws 10.

It will be seen that when the shaft 4 is rotated the arms 6 by bearing upon the rear ends of the arms 7 cause the forward ends thereof together with the picks to be raised, and as the arms 6 clear the arms 7 the picks and the forward ends of the arms 7 drop by gravity and exert a roughening or sharpening action upon the face of the millstone, upon which latter the entire device is supported during the operation of dressing the stone. To increase the force of the blow made by the picks upon the stone, we employ springs 12, the upper ends whereof are secured to the arms 7 and the lower ends being secured to a transverse piece 13 of the frame 3. When the picks and their supporting-arms are raised, the springs are distended, and when the picks and their arms descend their descent is accelerated by the springs, as will be understood.

It will be understood that any desired number of picks may be employed by increasing the width of the machine and varying the number of operating-arms 6 to correspond with the number of picks and their supporting-arms. It will also be understood that the arms 6 may be arranged upon the shaft 4, so as to operate successively upon the arms 7, as seen, or said arms may be arranged so as to act simultaneously upon all the arms 7 to cause the picks to deliver their blows simultaneously, if this be desired.

The shape of the picks may of course be varied, and their lower cutting edges should be sufficiently sharp to effect a sharpening or roughening action upon the stone.

In order that the picks may be made to automatically traverse the face of the stone during the dressing operation, we provide means whereby this result may be accomplished from the operating-shaft, which means are as follows:

14 indicates a gear-wheel mounted on the shaft 4 and meshing with a gear-wheel 15 on a transverse shaft 16, which is also provided with two bevel gear-wheels 17 18 loosely mounted on the shaft 16. These gear-wheels 17 18 mesh with a bevel gear-wheel 19, mounted on one end of a screw-shaft 20, having a bearing at one end on the frame 3 and screwing within a threaded perforation in the frame 1.

21 indicates a clutch which is slidingly mounted on the central squared portion of the shaft, the opposite clutch-faces 23 of which clutch are adapted to engage with the clutch-faces 24 24' of the gear-wheels 17 18.

The numeral 32 designates a block slidingly mounted upon a transverse rod 26, and provided with a handle 25, by which it may be reciprocated. This block is formed with an aperture through which said rod passes, and is provided with downwardly-extending curved arms 34, which engage with a peripheral groove in the clutch. When the clutch engages the gear 17, the frame 3, together with all the parts supported thereby, including the picks, will be caused to travel rearwardly, which rearward movement may be continued for the entire length of the screw-shaft. When the clutch is shifted to engage the gear 18, the screw-shaft will be rotated in the opposite direction, whereby the frame 3 and parts carried thereby, including the picks, will be automatically fed forward again. In this manner the entire surface of the stone may be quickly and thoroughly dressed.

The frame 1 is provided with vertically-adjustable supporting-legs 28, said legs having slots 29, through which work screws 30, having thumb-nuts 31, whereby the legs may be held in the desired adjusted position. These adjustable legs are important, for the reason that inasmuch as the device is supported upon the stone being dressed it becomes necessary to move the device into different positions upon the stone during the operation, and when the main frame projects beyond the edge of the stone, the adjustable legs are extended, so as to secure a bearing upon the table, floor, or other support upon which the stone lies. Thus the machine always has a firm and even bearing or support when operating on all parts of the stone.

What we claim, and desire to secure by Letters Patent, is—

In a millstone-dressing machine, the combination with the frame, the transverse shaft, the arms pivoted thereon provided with picks, the cam-shaft and cams, and the cog-wheel, of the reciprocating frame in which said cam-shaft and pick-shaft are journaled, the driving-shaft also journaled in said frame, having an angular central portion, the cog-wheel fixed to said shaft and the loose bevel-gears having clutch-faces on their adjacent sides, the screw-threaded horizontal shaft engaging with said frames and provided with a bevel-gear engaging with the gears on the driving-shaft, the clutch mounted upon the angular portion of said shaft, adapted to engage with the clutch-faces of said loose gears, and having a peripheral groove, the curved arms engaging therewith, the reciprocating block to which said arms are secured, formed with a hole or aperture, the transverse rod passing therethrough, and the handle secured to said block, substantially as described.

In testimony whereof we affix our signatures in presence of two witnesses.

REDDING L. MAY.
    LEWIS T. HUNTER.

Witnesses:
 R. A. WHITAKER,
 J. P. BROYDEN.